March 28, 1944.  O. STEINER  2,345,365
PHOTOGRAPHIC SHUTTER PARTICULARLY ADAPTED FOR AERIAL PHOTOGRAPHY
Filed Oct. 9, 1942  4 Sheets-Sheet 1
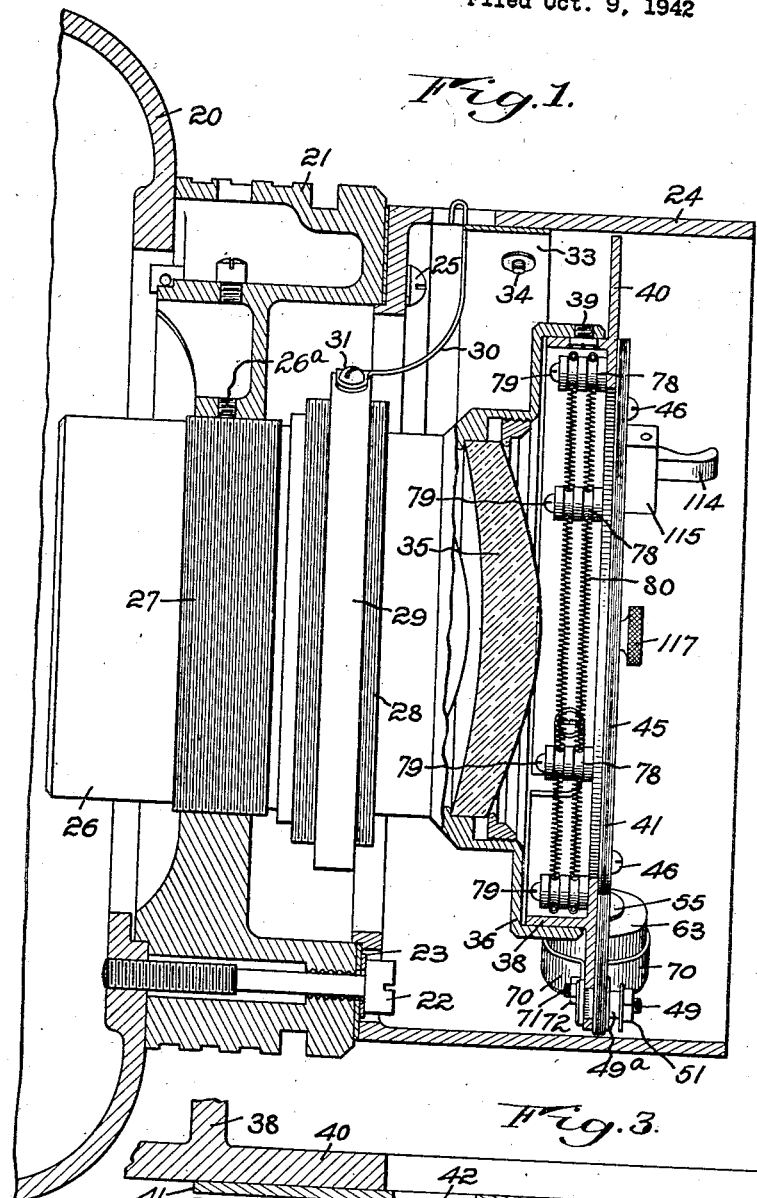
INVENTOR.
Oscar Steiner
BY
his Attorneys March 28, 1944.  O. STEINER  2,345,365
PHOTOGRAPHIC SHUTTER PARTICULARLY ADAPTED FOR AERIAL PHOTOGRAPHY
Filed Oct. 9, 1942  4 Sheets-Sheet 2

Inventor
Oscar Steiner
BY
his Attorneys

March 28, 1944.　　　　　　　O. STEINER　　　　　　　2,345,365
PHOTOGRAPHIC SHUTTER PARTICULARLY ADAPTED FOR AERIAL PHOTOGRAPHY
Filed Oct. 9, 1942　　　　4 Sheets-Sheet 3

Fig. 9.

INVENTOR.
Oscar Steiner
BY
his Attorneys

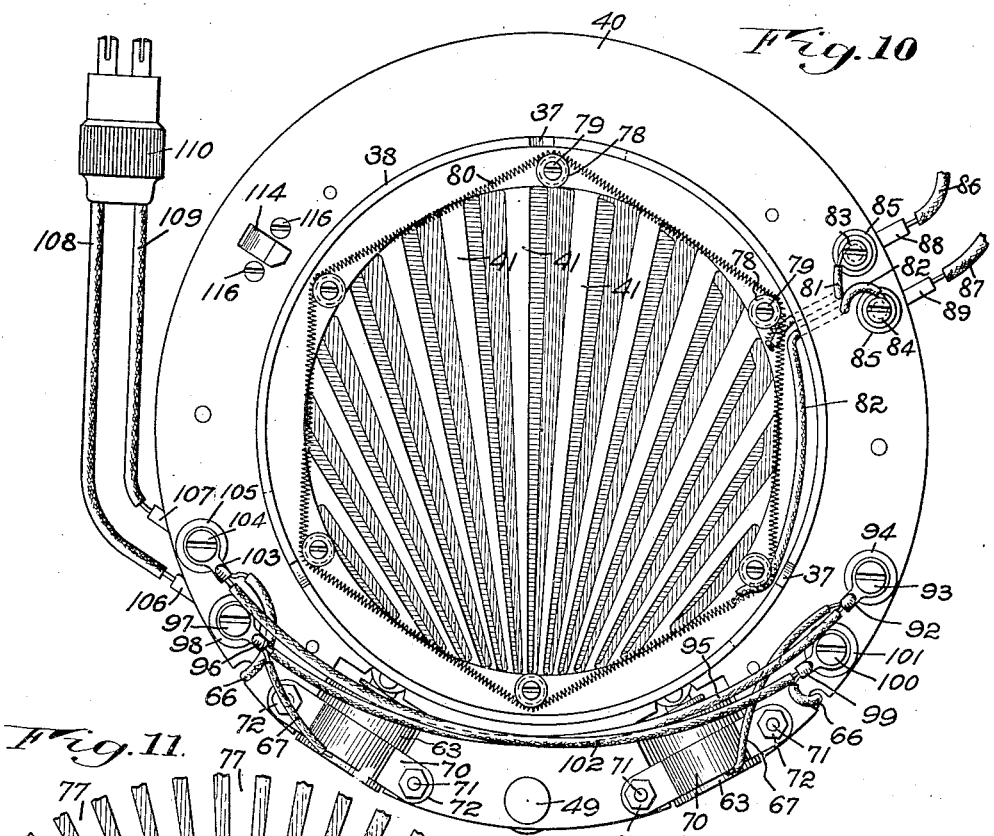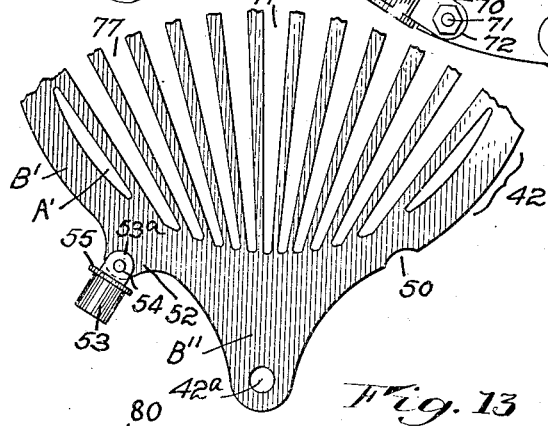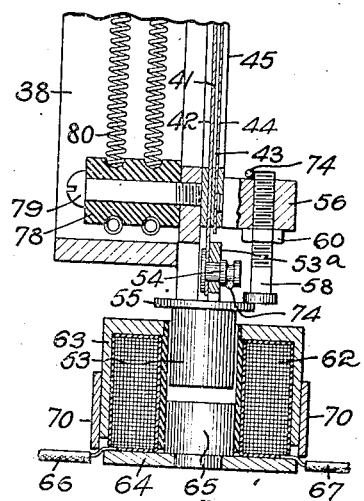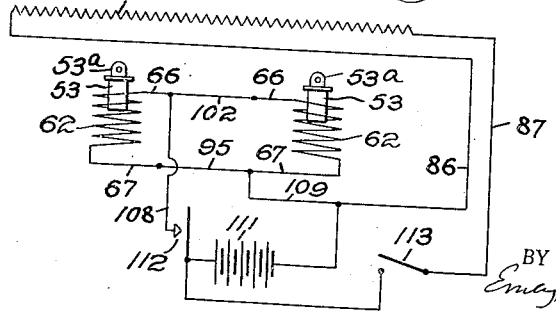

Patented Mar. 28, 1944

2,345,365

UNITED STATES PATENT OFFICE 2,345,365

PHOTOGRAPHIC SHUTTER, PARTICULARLY ADAPTED FOR AERIAL PHOTOGRAPHY

Oscar Steiner, Rochester, N. Y., assignor to The Folmer Graflex Corporation, Rochester, N. Y., a corporation of Delaware Application October 9, 1942, Serial No. 461,396

33 Claims. (Cl. 95—59)

This invention relates to new and improved photographic shutters particularly adapted to aerial photography.

In order that the principle of the invention may be readily understood, I have disclosed a single embodiment thereof in the accompanying drawings, wherein—

Fig. 1 is a partial cross section through an aerial camera and my shutter showing the mounting of the lens barrel and of the said shutter;

Fig. 2 is a left hand side elevation of the shutter removed from the lens barrel;

Fig. 3 is a horizontal section through Fig. 9 taken on the line 3—3 thereof, showing the position of the several grids when the shutter is in the closed position;

Fig. 4 is a view similar to Fig. 3 but showing the position of the movable grids when the shutter is open;

Fig. 5 is a horizontal section through Fig. 6 on the line 6—6 thereof, showing the manner of attaching the several grids to the shutter base member;

Fig. 9 is an enlarged fragmentary elevation of the shutter showing the front, fixed, grid plate in solid lines and the two movable plates in dotted lines, the shutter being in the closed condition;

Fig. 10 is a rear elevation of the shutter, showing the mounting of the several parts, and also showing the positioned heater unit, the shutter being in closed condition;

Fig. 11 is a fragmentary elevation of the second movable grid plate of the shutter;

Fig. 12 is a section through Fig. 9 on the line 12—12 thereof, showing the construction of the electrical operating means, the adjusting means therefor, and the positioned heater unit; and Fig. 13 is a schematic circuit diagram of the shutter and heater unit.

Figure 6:
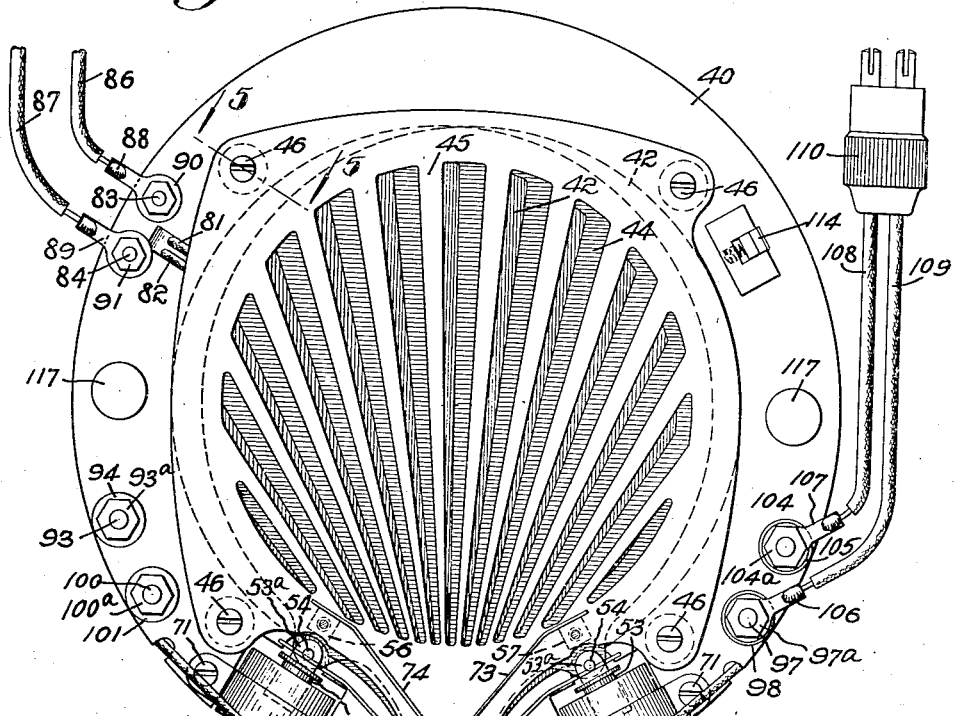
Fig. 6 is a front elevation of the shutter in the closed condition, and showing the electrical connections for effecting shutter operation, and also showing the shutter heater.

One of the objects of this invention is to provide a quickly detachable and attachable shutter having high-speed opening characteristics. Among other objects of the invention are to provide a shutter made up of grid plates that are operated by built-in electrical operating means; to provide a shutter having a built-in heating unit; to provide a shutter that is adapted to be attached to standard lens barrels, preferably close to the front lens element and having an opening sufficiently large so that it does not obstruct the light cones passing to said lens element; to provide electrical control means for operating the two movable grid plates simultaneously and in opposite directions; and to provide a shutter having built-in electrical operating means that can be controlled from a remote point both as to the time of opening the shutter and the time duration of the opening thereof.

In the accompanying drawings and in this specification, I set forth the preferred embodiment of my invention. It will, however, be apparent that very considerable departure from the single showing can be made without changing the idea of my invention, and the same are within the scope thereof.

When making photographs in the air, using flash bombs for illumination, it is essential that a shutter be provided that can be quickly opened and quickly closed. If such a shutter is to be operated by electric or electromagnetic means, it is necessary to have the shutter completely open and not more than ten milliseconds after the bomb becomes illuminated. Since the lenses used in this type of work are of relatively large aperture, it is necessary to have a shutter having a large opening. Therefore, the area to be closed before and after making an exposure is considerable, and when shutters of the now existing type are used, the shutter leaves and other moving parts constitute considerable masses to be set in motion, and so far as I know, no shutter has yet been produced having a sufficiently large aperture that can be fully opened in the time specified.

To accomplish this very desirable operation, I have, in accordance with my invention, provided a shutter of the multiple grid type having two movable grid plates and three stationary grid plates, the movable grid plates moving in opposite directions, and when the shutter is fully opened, the grid bars of the movable grid plates are positioned behind and in front of the bars of the stationary grid plates. Since the movable grid plates can be made of very light weight material and the total weight of these movable grid plates is very small, it is possible to operate these grid plates in a maximum time of five milliseconds from the time contact is made until the shutter is fully open.

It is also desirable to have a shutter of the type just referred to—that is, of a structure that is quickly detachable from the camera objective lens so that any aerial camera can be quickly converted to a camera for night photography.

It is also desirable to provide a heating means for the objective lens to prevent it from frosting when making a rapid descent from a high altitude, and since there is usually no filter used when making these photographs, a heater having considerably more heat output is necessary than when used in combination with a filter.

Referring first to Fig. 1, a portion of the body of an aerial camera is indicated at 20, and thereto is attached a lens support mounting ring 21 by means of lock screws 22, 22, lock washers 23 being provided to hold securely the said lock screws 22, 22. To the said lens support ring 21 there is attached a lens shade 24 by means of screws 25, 25, and threaded into an opening provided therefor in the lens support ring 21 is a lens barrel 26 locked in place by locking screws 26a and threaded at 27. The said lens barrel 26 is also provided with a second threaded portion or section 28 to which is fitted a diaphragm control ring 29 of the usual and well known structure, and requiring no further description.

In order to operate the diaphragm control ring 29 from the outside of the lens shade 24, there is provided an arm 30 extending outwardly as indicated and attached to the diaphragm control ring 29 by screws, one of which is indicated at 31 in Fig. 1. The said arm 30 extends through a peripheral opening of the lens shade 24, and in order to hold the arm 30 in any selected position, there is provided a curved retaining plate 33 held to the lens shade 24 by screws, one of which is shown at 34 in Fig. 1. The said retaining plate 33 is provided with a series of edge notches (not shown) properly spaced so as by engagement with the arm 30 to hold the diaphragm control ring 29 in the selected position. The lens barrel 26 is partially broken away in Fig. 1 in order to show the front lens element 35, and the lens barrel 26 is also provided with a ring-like, forwardly extending, flange formation 36 to which are attached the parts to which my invention is more particularly directed.

The structure just described constitutes parts of an aerial camera not herein claimed by me as a sole inventor, but which is or will be claimed by me and other co-inventors in a co-pending application.

I will now describe the shutter to which my invention herein claimed is more particularly directed, and in doing so I will refer to the other figures of the drawings wherein the details of the shutter are shown.

Attached to the said flange formation 36 of the lens barrel 26 by means of bayonet openings 37, 37, in a cylindrical flange 38 is a shutter to which my invention is more particularly directed. The said flange 36 is provided with three equally spaced screws, one of which is shown at 39 in Fig. 1, and to which the bayonet openings 37 are fitted.

The shutter itself is carried by a flat basal ring 40 having laterally extending from the inner face thereof the cylindrical flange 38 previously referred to. To the front face of the shutter basal ring 40 are attached five grid plates 41, 42, 43, 44 and 45 in a face to face relation, best shown in Figs. 3, 4 and 5. Of the said grid plates, the plates 41, 43 and 45 are held in stationary relation to said shutter basal ring 40 by means of screws 46, 46 at suitable circumferential points, which are held in proper spaced relation by spacing washers 47, 48, shown in Fig. 5. The intervening grid plates 42 and 44 are supported for movement in a manner to be described.

Figure 7:
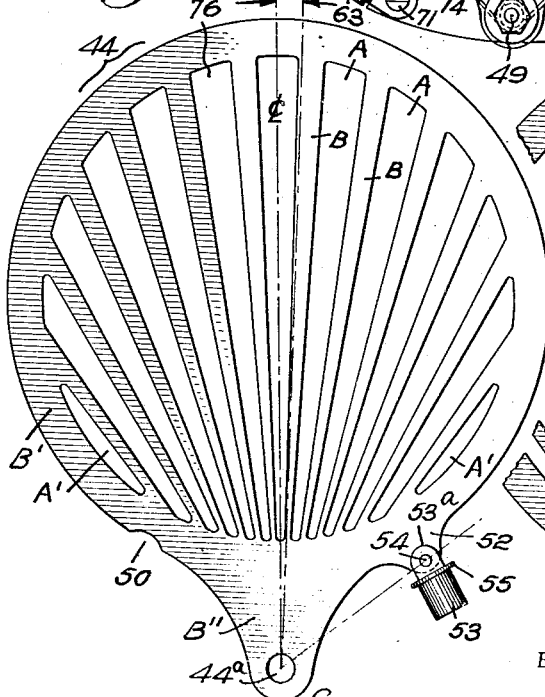
Fig. 7 is a vertical elevation of one of the movable shutter plates or grids, the shutter being in the closed condition.
Figure 8:
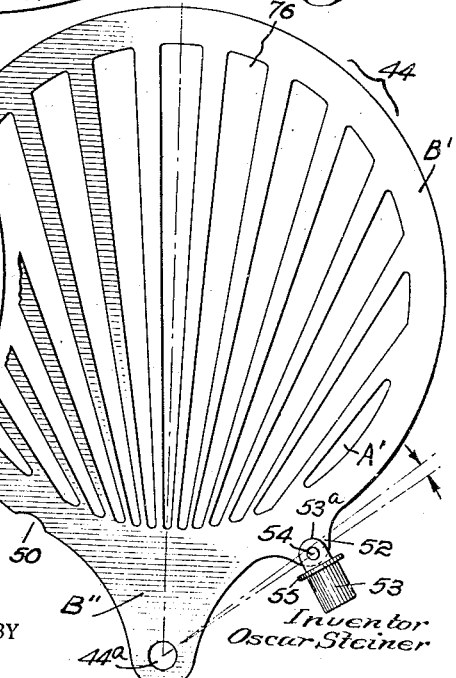
Fig. 8 is a view similar to Fig. 7, but with the shutter plate or grid moved to the open condition.

The structure of the movable grid plates 42 and 44 is best shown in Figs. 7, 8 and 11, being also indicated in Figs. 6, 9 and 10. As is there evident, each of said movable grid plates 42, 44 is, in the disclosed embodiment of the invention, of what may be termed a fan-like shape of generally circular contour. Each of all said plates (particularly plates 42, 44) is very thin, being desirably constructed of very thin sheet metal, such as beryllium copper, as disclosed in my co-pending application Ser. No. 368,394. Each of all said plates is provided with a series of openings A with intervening bars B, said openings and bars radiating from a point at or near the pivot of the movable plates 42, 44, and from a corresponding point in the case of the three stationary grid plates, as will be evident from Figs. 6 and 9. As best shown in Figs. 7 and 8, and as is also evident from Figs. 6 and 9, the openings A and the bars B are of increasing width from the lower end to the upper end thereof, excepting in the case of the two marginal openings A', A', which are here shown as segmental.

The two movable plates 42, 44 are desirably identical in structure, and may be defined as nearly circular in outline but as having the surrounding rim B' which is parallel sided throughout the greater portion of its extent, prolonged downwardly as indicated at B" to provide a pivotal point of support to be referred to.

The stationary grid plates 41 and 45, which are respectively beyond and outside of the movable grid plates 42 and 44, are, as shown in Figs. 3, 4 and 5, provided with openings and intervening bars the same as the openings A and bars B of the movable grid plates 42 and 44. In Figs. 6, 7, 8 and 11 the gride plates are shown of full size.

Each of the two movable grid plates 42 and 44 is provided with a pivotal opening indicated at 42a and 44a, shown in Figs. 7, 8 and 11. The grid plate 42 is positioned and mounted for oscillation between the stationary grid plates 41 and 43 and the grid plate 44 is positioned and mounted for oscillation between the grid plates 43 and 45, and for that purpose both of said movable grid plates 42 and 44 are pivoted upon a stud 49, shown in Figs. 1, 2, 6 and 9.

The two stationary grid plates 41 and 45 are the same in structure and shape as best appears in Figs. 6 and 10, and the stationary grid plate 43 is also of the same structure and shape. As stated, the shape and structure of the movable grid plate 42 are best shown in Fig. 11, and the shape and structure of the movable grid plate 44 are best shown in Fig. 8. The said two movable grid plates 42 and 44 are entirely symmetrical and each has a clearance cut-out 50. When assembling the grid plates, they are assembled face to face so that the clearance cut-out 50 of the movable grid plate 44 is on the left hand side viewing Figs. 7 and 8, and the cut-out 50 of the movable grid plate 42 is on the right hand side viewing Fig. 11. Actually the said movable plates 42 and 44 are identical, but they are assembled as stated.

The stud 49 whereon the movable grid plates 42 and 44 are pivoted passes through the flat basal ring 40 and also through the stationary grid plates 41, 43 and 45 and through the spacing bushing 49a, shown in Figs. 1 and 2. The said stud 49 is provided with a shoulder (not shown) of proper height and receives a nut 51, the construction being such that when the nut 51 is tightened, the movable grid plates 42 and 44 will not be clamped between the stationary grid plates 41, 43 and 45, but will be free to be oscillated or swung to and fro by the operating means to be described.

In order to oscillate the said movable grid plates 42 and 44, I have, in the selected embodiment of my invention as best shown in Fig. 12 taken with Figs. 7, 8 and 11, provided an electrical solenoid for each of the said movable grid plates 42 and 44. As shown in said figures, the said two movable grid plates 42 and 44 are each provided with a boss 52, which is desirably a slight outward continuation or swell of the same thickness as the substance of the grid plate and projecting in the plane thereof, as indicated in Figs. 7, 8 and 11. To each boss 52 is suitably attached a solenoid core or armature 53 by means of a shoulder rivet 54, such armature (as shown in Fig. 12) having a protruding member 53a through which the rivet 54 passes. Each armature 53, as shown most clearly in Fig. 12, is provided with a flange 55 of enlarged diameter to act as a stop. For that purpose, there are attached to the stationary grid plate 45, as best shown in Fig. 9, two adjusting blocks 56 and 57, and threaded thereinto respectively are adjusting screws 58, 59 provided with lock nuts 60, 61. The said structure provides means for readily adjusting the starting position of the movable grid plates 42 and 44.

In order to swing or oscillate the movable grid plates 42 and 44, I have provided two solenoid windings 62, both indicated in the diagram Fig. 13, and one being shown in detail in Fig. 12. The said windings each has a metal shell or housing 63, a metal base 64, a stationary armature 65 and connected leads 66 and 67. The said solenoids are attached directly to the said shutter basal ring 40 within the contour thereof, as shown in Figs. 9 and 10, being securely clamped or held in position in openings provided therefor, as indicated at 68, 69 by semicircular straps 70, 70, and shown also in Figs. 1 and 2, but upon an enlarged scale in Fig. 9. The said straps 70, 70 are attached to the said flat basal ring 40 by bolts 71, 71 having nuts 72, 72, and the form of the straps 70, 70 is such that when clamped to the flat basal ring 40 each solenoid shell or housing 63 is held securely in place.

Referring to Fig. 7, it is noted that the movable shutter grid plate 44 is normally held in position to the left of the center of the shutter and is there so shown. The broken line C—L is the true center line of the said grid plate 44, and the second broken line slightly to the right of the line C—L represents the true center through the shutter.

The said grid plate 44 is held in the described position by a hairpin spring 73, as shown in Figs. 6 and 9, one end of said spring riding on the adjusting block 57, and the other end in a groove in the shoulder rivet 54, the bushing 49a supporting and holding the said spring in place. The said spring 73 is so tensioned as to cause the armature 53 pertaining thereto to be moved out of the corresponding solenoid 63 and this would cause the grid plate 44 to be moved to the left viewing Fig. 7, to the closed position.

The other movable grid plate 42 is caused to be moved to the right viewing Fig. 11 by a similar spring 74 similarly supported and which operates in the manner described with respect to spring 73.

When the entire grid shutter is in its closed position or position of rest, the bars of the grid plates 45, 44 and 42 overlie each other, as most clearly shown in Figs. 3 and 6, and when the solenoid windings 62, 62 are energized, causing the armatures 53, 53 to be moved toward the stationary armatures 65, 65, the grid plate 44 will be caused to move or swing to the right and the grid plate 42 will be caused to move or swing to the left viewing Figs. 6 and 9, thus causing the bars of the movable grid plates 42 and 44 to lie directly behind bars of the stationary grid plate 45 and directly in front of the bars of the stationary grid plate 41, and inasmuch as the stationary grid plate 43 is always in alignment with the stationary grid plates 41 and 45, as respects the bars and openings thereof, clear openings will be provided between the bars of the several grid plates, inasmuch as the grid bars of all five grid plates will then be in accurate alignment as shown in Fig. 4.

When the electrical circuit to the solenoid coils 62 is broken, the grid plate 42 is caused to move or swing to the right and the grid plate 44 is caused to move or swing to the left, viewing the several figures, by the springs 73, 74 respectively, thus causing the grid shutter to be closed, as shown in Figs. 6 and 9.

In Fig. 9 is shown an enlarged view of the shutter when closed, and therein the several openings of the stationary removable grid plates are shown in dotted lines. In order clearly to show the positions of the openings in the several grid plates when the shutter is in the said closed position, the openings of the front stationary grid plate 45 are, in Fig. 9, designated as 75, the openings of the movable grid plate 44 being there designated as 76 and the openings of the movable grid plate 42 being there designated as 77. It will be noted particularly in Fig. 9 that the bars between the openings 77 of the grid plate 42 and the bars between the openings of the grid plate 44 overlap and completely close the openings 75 of the front stationary grid plate 45.

The described structure provides a photographic shutter that can have a very large aperture but nevertheless the distance of movement of each of the movable grid plates is very short so that a very high speed opening and closing action of the shutter is obtained. It will also be observed, viewing particularly Figs. 6 to 10, that each of the openings A of each of the movable grid plates 42 and 44 is entirely unobstructed from end to end, owing to the fact that the pivotal point upon which the movable grid plates 42 and 44 operate is at or near the periphery of the said grid plates, being, as previously stated, provided at 42a and 44a in downward prolongations B″ of the rims B′ of the said grid plates 42, 44.

The bars of all the grid plates are flat throughout and are of the same cross section with respect to each other at whatever point the cross section may be taken, whether at a greater or a lesser distance from the pivotal center of oscillation 49, and at any point where a cross section is taken, the cross dimension of a bar is very materially less than the cross width of a space or opening at that cross section. The result is that when the flat bars of all the grid plates are superposed, they obstruct not to exceed forty per cent of the total area within the surrounding rim of each grid plate.

It is evident that there must be some overlap of the flat bars of the several grid plates when the shutter is closed. It would be impossible with only two grid plates in a shutter to obtain a greater total aperture than forty per cent, and such a shutter would therefore pass only forty per cent of the light that would be passed by the objective lens of the camera if there were no obstructions. By employing at least three grid plates there is obtained a greater opening or aperture since the bars of all the grid plates are utilized to cover the spaces, with the result that of the entire space, forty per cent is occupied by the bars and sixty per cent by the spaces.

The provision of five shutter grid plates with the mutual support given by such plates to each other prevents fluttering, which would occur if the grid plates were unsupported, and especially when the shutter is operated in a strong blast of air.

Inasmuch as the shutter herein disclosed is intended primarily to be used for aerial photography, it is necessary to provide means for heating both the shutter and the objective lens of the camera in order to protect the shutter and the lens from frosting during rapid descent of the airplane from high altitudes.

For this purpose, I have, for the first time in the art so far as I am aware, provided a heater that is built directly into or onto the shutter, as most clearly shown in Figs. 1, 10 and 12, and desirably in such a way that the basal ring 40 with the shutter and the heater constitute a single unit that can be readily attached to and detached from the lens barrel or other supporting means. As shown in Figs. 1, 10 and 12, just inside the cylindrical flange 38, as best shown in the rear view of the shutter Fig. 10, there is attached a series of suitably and preferably equally spaced porcelain bushings 78 held to the shutter basal ring 40 by screws 79. While six equally spaced bushings are shown, any suitable number thereof may be provided.

In grooves provided in the bushings 78 is placed a coil of resistance wire 80 (shown also in diagram Fig. 13), one end of which is attached to the wire 81. The wire 81 passes around the several bushings 78 in a contraclockwise direction in two complete coils, and at the end of the second coil the wire 80 is attached to a wire 82. The wires 81 and 82 are connected to binding posts 83 and 84 respectively, which posts are insulated from the shutter basal ring 40 by insulating bushings 85, 85, and connected to the said binding posts 83, 84 are current supply wires 86, 87 having terminals 88, 89 held to the binding posts 83, 84 by nuts 90, 91, all as clearly shown in Figs. 10 and 12.

The solenoid coils 62, 62 are connected in parallel, as clearly shown in the diagram Fig. 13 and in Fig. 10. The wire 67 of the right hand solenoid 62 is attached to a terminal 92 connected to a binding post 93 insulated from the shutter basal ring 40 by insulating bushings 94, 94. Also connected to the terminal 92 is a wire 95 that is connected to a terminal 96 on the left hand side of the shutter viewing Fig. 10. The terminal 96 is connected to a binding post 97 insulated from the shutter basal ring 40 by insulating bushings 98. Also connected to the terminal 96 is the wire 67 that is connected to the left hand solenoid 62. The wire 66 of the right hand solenoid 62, viewing Fig. 10, is connected to a terminal 99 itself connected to a binding post 100 insulated from the shutter basal ring 40 by insulating bushings 101, 101. Also connected to the terminal 99 is a wire 102 that is connected to a terminal 103 on the left hand side of the shutter viewing Fig. 10, and said terminal 103 is connected to a binding post 104 insulated from the shutter basal ring 40 by insulating bushings 105, 105. Also connected to the terminal 103 is the wire 66 which is connected to the left hand solenoid 62, viewing the several figures. Connected to the binding posts 97 and 104 are terminals 106, 107 held in place by nuts 97a and 104a respectively. The said terminals 106 and 107 connect with wires 108, 109 respectively, terminating in a connecting plug 110.

Referring to the circuit diagram Fig. 13, therein is indicated a common battery 111, a switch 112 for operating the shutter and a switch 113 for controlling current to the heater.

The shutter herein disclosed may be operated in any one of several ways. If desired, the switch 112 may be manually closed and the shutter will remain open as long as said switch 112 remains closed. When the camera having the described shutter is used in normal air photography, as contrasted with stratosphere or sub-stratosphere flights, the switch 112 will either be mechanically controlled through a time device or be controlled through an electromagnetic circuit when doing night photography. It is apparent that any number of different controls can be used, all within the scope of my invention. A mechanical delay device may also be used wherein an electric circuit serves to open the shutter and a gear train or other suitable time device acts to delay the closing, and this is within the scope of my invention.

In order to prevent the shutter herein described from becoming detached from the lens barrel of the camera, and referring to Figs. 1 and 2, I have provided latching means consisting of a latch 114 supported by a bracket 115. The inner end of the latch 114 projects within the shutter basal ring 40 and the bracket 115 is secured to the said basal ring 40 by screws 116, 116. The flange 36 of the lens barrel 26 is provided with a suitable screw or stud (not shown) which is engaged by the latch 114 when the screws 39 are in locked position in the slots or bayonet openings 37, 37.

A cover is normally provided for enclosing the front of the shutter to exclude dust and to prevent possible mechanical injury, but for clearness of showing other parts the cover has been omitted. It is, however, normally held to the shutter basal ring 40 by thumb screws, one of which is shown at 117 in Figs. 1 and 2.

The high speed, large aperture, grid shutter herein disclosed has been developed particularly for the armed forces of the United States for use with aerial cameras in night photography wherein flash bombs are used for obtaining illumination. It is necessary for such purpose to provide a shutter having a very high opening speed because the time delay from the time the flash bomb is first ignited until said flash bomb reaches the peak of illumination is around fifteen milliseconds, and inasmuch as the herein disclosed photographic shutter, for some types of work, is operated by a photo-electric circuit using light picked up from the flash bomb when first ignited, the shutter must be opened by the time the bomb reaches its peak of illumination.

The shutter herein disclosed has by actual tests been found to work with entire satisfaction.

Having thus described one illustrative embodiment of the invention, it is to be understood that although specific terms are employed, they are used in a generic and descriptive sense and not for purposes of limitation, the scope of the invention being set forth in the following claims.

I claim:

1. In a photographic camera having a lens barrel with an objective lens, a shutter basal plate with attaching means by which it may be readily attached to and detached from said lens barrel in substantial parallelism, and in close proximity, to an element of said lens, and a shutter and a heater therefor both mounted upon said basal plate, so as with said plate to constitute a readily removable unit.

2. In a photographic camera having a lens barrel with an objective lens, the said lens barrel having at its forward part a flange-like extension in proximity to said lens, a shutter basal plate attached to said extension in substantial parallelism to and in close proximity to said lens, a shutter mounted upon one face of said basal plate and a heater for said shutter mounted upon the opposite face of said basal plate.

3. In a photographic camera having a lens barrel with an objective lens, a basal shutter plate adapted to be readily attached to and to be readily detached from said lens barrel in substantial parallelism, and in close proximity, to said lens, and a shutter and a heater both mounted directly upon said basal plate, said basal plate, shutter and heater constituting a unit for ready application to the lens barrel of a photographic camera.

4. In a photographic camera having a lens barrel with an objective lens, a basal shutter plate adapted to be readily attached to and to be readily detached from said lens barrel in substantial parallelism, and in close proximity, to said lens, and a shutter and a heater both mounted directly upon said basal plate, said basal plate, shutter and heater constituting a unit for ready application to the lens barrel of a photographic camera, and an electric circuit means for operating said shutter and for causing said heater to function.

5. In a photographic camera having a lens barrel with an objective lens, a basal shutter plate adapted to be readily attached to and to be readily detached from said lens barrel in substantial parallelism, and in close proximity, to said lens, and a shutter and a heater both mounted directly upon said basal plate, said basal plate, shutter and heater constituting a unit for ready application to the lens barrel of a photographic camera, solenoid means mounted upon said basal plate and operatively connected with said shutter to operate the latter, said heater including wiring of an electric circuit with battery, within which circuit said solenoid means is included.

6. A grid shutter assembly or attachment for application to a photographic camera, including in combination, two movable grid plates and at least one stationary grid plate, all in face to face relation, each such plate having a rim within which are spaced bars alternating with unobstructed openings, said movable grid plates being coaxially pivotally mounted for oscillatory movement in opposite directions, at said rims.

7. A grid shutter assembly or attachment for application to a photographic camera including, in combination, two movable grid plates and at least one stationary grid plate, all in face to face relation, each such plate having a rim within which are spaced bars alternating with unobstructed openings, and means to oscillate said movable grid plates from points at the rims thereof.

8. A grid shutter assembly or attachment for application to a photographic camera including, in combination, two movable grid plates and at least one stationary grid plate, all in face to face relation, each such plate having a rim within which are spaced bars alternating with unobstructed openings, and means to oscillate said movable grid plates from points outside of said bars and openings, so as to leave unobstructed by the oscillating means all the area of each grid plate that is within the rim thereof.

9. A grid shutter assembly or attachment for application to a photographic camera including, in combination, two movable grid plates and at least one stationary grid plate, all in face to face relation, each such plate being fan-like in shape and having an enclosing rim within which are spaced bars alternating with unobstructed openings.

10. A grid shutter assembly or attachment for application to a photographic camera including, in combination, two movable grid plates and at least one stationary grid plate, all in face to face relation, each such plate being fan-like in shape and having an enclosing rim within which are spaced bars alternating with unobstructed openings, said movable grid plates being coaxially pivotally mounted for oscillating movement in opposite directions from points at the rims thereof.

11. A grid shutter assembly or attachment for application to a photographic camera including, in combination, two movable grid plates and at least one stationary grid plate, all in face to face relation, each such plate being fan-like in shape and having en enclosing rim within which are spaced bars alternating with unobstructed openings, said movable grid plates being coaxially pivotally mounted for oscillating movement in opposite directions from points at the rims thereof, the bars and the openings being of gradually increasing width from their ends nearest the pivotal mounting to their opposite ends.

12. A grid shutter assembly or attachment for application to a photographic camera including, in combination, two movable grid plates and three stationary grid plates, said movable and stationary plates alternating with each other, two of said stationary grid plates being at the outside at front and back respectively of the shutter, each of the said plates having a rim within which are spaced bars alternating with unobstructed openings.

13. A grid shutter assembly or attachment for application to a photographic camera including, in combination, two movable grid plates and three stationary grid plates, said movable and stationary plates alternating with each other, two of said stationary grid plates being at the outside at front and back respectively of the shutter, each of the said plates having a rim within which are spaced bars alternating with unobstructed openings, and means to move said movable grid plates in opposite directions.

14. A grid shutter assembly or attachment for application to a photographic camera including, in combination, two movable grid plates and three stationary grid plates, said movable and stationary plates alternating with each other, two of said stationary grid plates being at the outside at front and back respectively of the shutter, each of the said plates having a rim within which are spaced bars alternating with unobstructed openings, said movable grid plates being co-axially pivotally mounted for oscillating movement in opposite directions at said rims.

15. A grid shutter assembly or attachment for application to a photographic camera, including in combination, two movable grid plates and at least one stationary grid plate, all in face to face relation, each such plate having a rim within which are spaced bars alternating with unobstructed openings, said movable grid plates being coaxially pivotally mounted for oscillatory movement in opposite directions at said rims, two solenoids directly connected to the rims of the two movable grid plates respectively, and an electric circuit including said solenoids and having switch means.

16. A grid shutter assembly or attachment for application to a photographic camera, including in combination, two movable grid plates and at least one stationary grid plate, all in face to face relation, each such plate having a rim within which are spaced bars alternating with unobstructed openings, said movable grid plates being coaxially pivotally mounted for oscillatory movement in opposite directions at said rims, two solenoids directly connected oppositely to the rims of said two movable grid plates, and an electric circuit including said solenoids for oscillating said movable grid plates oppositely.

17. A grid shutter assembly or attachment for application to a photographic camera including, in combination, a shutter basal plate attachable to the lens barrel of the camera, and a grid shutter attached to one face of said basal plate and including two movable grid plates and at least one stationary grid plate, all in face to face relation, each such grid plate having a rim within which are spaced bars alternating with unobstructed openings to constitute the grid.

18. A grid shutter assembly or attachment for application to a photographic camera including, in combination, a shutter basal plate attachable to the lens barrel of the camera, and a grid shutter attached to one face of said basal plate and including two movable grid plates and at least one stationary grid plate, all in face to face relation, each such grid plate having a rim within which are spaced bars alternating with unobstructed openings to constitute the grid, and means to oscillate said two movable grid plates in opposite directions.

19. A grid shutter assembly or attachment for application to a photographic camera including, in combination, a shutter basal plate attachable to the lens barrel of the camera, and a grid shutter attached to one face of said basal plate and including two movable grid plates and at least one stationary grid plate, all in face to face relation, each such grid plate having a rim within which are spaced bars alternating with unobstructed openings to constitute the grid, two solenoids carried by said basal shutter plate and connected oppositely to the rim of the two movable grid plates respectively, and an electric circuit including said solenoids and having switch means.

20. A grid shutter assembly or attachment for application to a photographic camera including, in combination, a shutter basal plate attachable to the lens barrel of the camera, and a grid shutter attached to one face of said basal plate and including two movable grid plates and at least one stationary grid plate, all in face to face relation, each such grid plate having a rim within which are spaced bars alternating with unobstructed openings to constitute the grid, said two movable grid plates being pivoted co-axially at their rims for oscillating movement, and two solenoids carried by said basal shutter plate and connected oppositely to the rim of the two movable grid plates respectively, and an electric circuit including said solenoids and having switch means.

21. A grid shutter assembly or attachment for application to a photographic camera including, in combination, two movable grid plates and a series of alternating stationary grid plates all substantially circular in contour and each having an encircling rim within which are spaced bars alternating with unobstructed openings, said movable grid plates being co-axially pivotally mounted for oscillating movement at a point substantially at their rims, and means for oscillating said movable grid plates including two separate electromagnets, one for each of said movable grid plates, and an electrical circuit wherein said electromagnets are in parallel.

22. A grid shutter assembly or attachment for application to a photographic camera including, in combination, two movable grid plates and a series of alternating stationary grid plates all substantially circular in contour and each having an encircling rim within which are spaced bars alternating with unobstructed openings, said movable grid plates being co-axially pivotally mounted for oscillating movement at a point substantially at their rims, means for oscillating said movable grid plates including two separate electromagnets, one for each of said movable grid plates, an electrical circuit wherein said electromagnets are in parallel, and a shutter basal plate whereon all of said grid plates and also said electromagnets are mounted.

23. A grid shutter assembly or attachment in accordance with claim 8, but wherein the area and shape of the corresponding bars and unobstructed openings of all of said grid plates are respectively the same, and wherein when said grid shutter is fully open the said bars are superimposed, and of the entire area within said rims forty per cent is occupied by the superposed bars and sixty per cent by the openings.

24. A grid shutter assembly or attachment in accordance with claim 9, but wherein the area and shape of the corresponding bars and unobstructed openings of all said grid plates are the same, and wherein the movement of said two movable grid plates into open position results in all the corresponding bars of said three grid plates being in accurate superposed relation, and so that of the area within said rims forty per cent is occupied by the superposed bars and sixty per cent by the openings.

25. A grid shutter assembly or attachment for application directly to the lens barrel of a photographic camera, including in combination a basal shutter plate of a size permitting it to be readily attached to and to be detached from said lens barrel in close proximity to a lens element in said barrel, shutter grid plates carried flatwise against and by said basal plate, at least one of said shutter grid plates being stationarily supported on said basal plate and two of said shutter grid plates being movably mounted, all in close face-to-face relation, each shutter grid plate having spaced bars alternating with unobstructed openings, the bars and openings being adapted to be brought respectively into superposed relation when the shutter constituted by said grid plates is open, an electric circuit means for operating said movable shutter grid plates, said circuit means including a resistance wire supported at one face of said basal plate outside of and substantially around the bars and openings of said shutter grid plates.

26. In a photographic camera particularly applicable for aerial photography, a lens barrel with an objective lens received therein and having a formation close to such lens for receiving the shutter, a basal ring directly received by said formation so as to be supported close to said lens, a shutter mounted directly upon said basal ring and consisting of relatively movable parts, an electrical heater attached to said basal ring so as to be in close proximity to said shutter and said lens, said basal ring, shutter and electrical heater constituting a unit for direct application to said lens barrel, so that when the said unit is in position the shutter and the lens are effectively heated.

27. A construction in accordance with claim 26, but wherein at least one solenoid is directly mounted upon said basal ring, and is connected by circuit wiring to a movable part of said shutter, and wherein said electrical heater is in circuit with such solenoid.

28. A construction in accordance with claim 26, but wherein said electrical heater includes a resistance wire supported on the inner face of said basal ring between it and said lens.

29. A construction in accordance with claim 26, but wherein said electrical heater includes a resistance wire supported on the inner face of said basal ring between it and said lens, and a solenoid mounted upon a face of said basal ring and in circuit with said resistance wire.

30. A construction in accordance with claim 26, but wherein said basal ring has extending from its inner face an annular flange adapted to be slid into and to engage the said receiving formation of the lens barrel.

31. A construction in accordance with claim 26, but wherein the said shutter consists of a series of grid plates carried flatwise against and by a face of said basal ring, at least one of said grid plates being stationary and secured in such position by means engaging said basal ring, and two of said grid plates being movable in opposite directions, all of said grid plates having spaced bars alternating with unobstructed openings, the bars and openings being adapted to be brought respectively into superposed relation when the shutter is open.

32. A construction in accordance with claim 26, but wherein the said shutter consists of a series of grid plates carried flatwise against and by the outer face of said basal ring, at least one of said grid plates being stationary and secured in such position by means engaging said basal ring, and two of said grid plates being movable in opposite directions, all of said grid plates having spaced bars alternating with unobstructed openings, the bars and openings being adapted to be brought respectively into superposed relation when the shutter is open, the said basal ring having two solenoids mounted thereon and connected to the said two oppositely movable grid plates, there being circuit wiring which includes therein said solenoids and said electrical heater.

33. A grid shutter assembly or attachment in accordance with claim 25, but wherein two solenoids are mounted upon said basal plate and constitute means to move said grid plates oppositely to open and close the shutter.

OSCAR STEINER.